April 9, 1957

C. N. CATON 2,788,225

TRIP STAKES FOR LOGGING TRUCKS

Filed May 26, 1955

Clyde N. Caton
INVENTOR.

BY *Clarence A. O'Brien*
*and Harvey B. Jacobson*
Attorneys

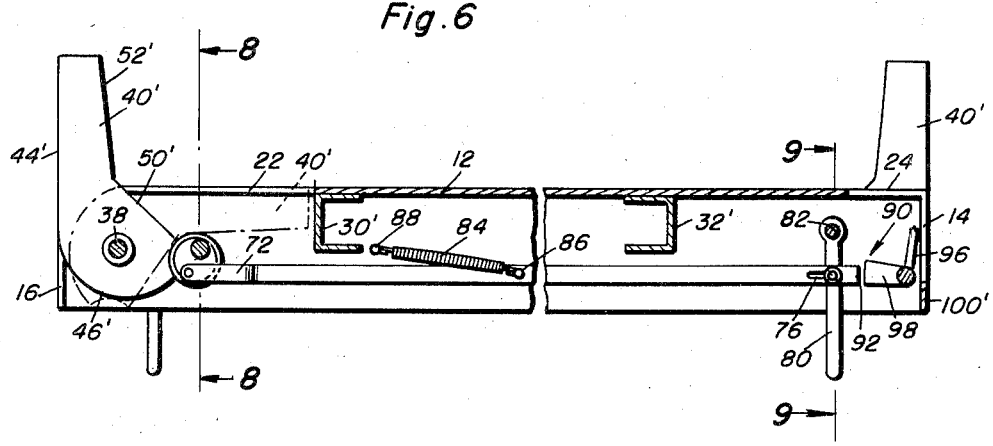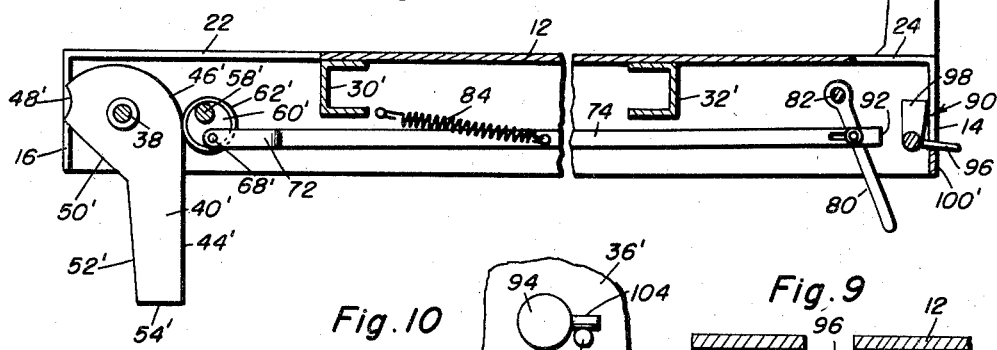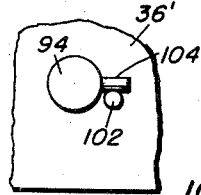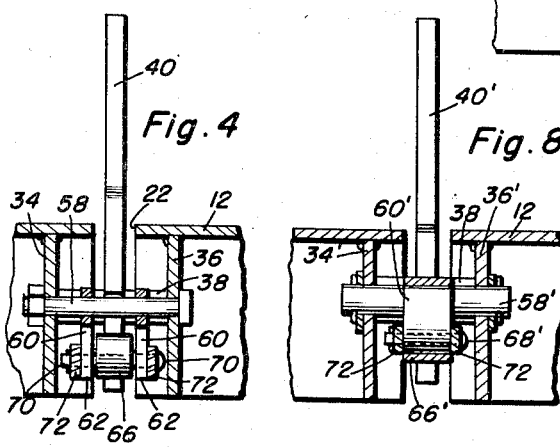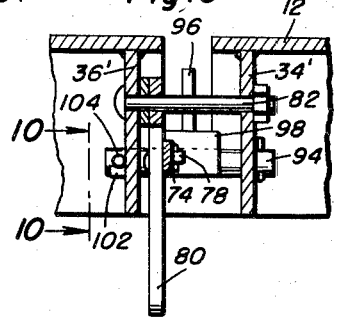

United States Patent Office 2,788,225
Patented Apr. 9, 1957

2,788,225
TRIP STAKES FOR LOGGING TRUCKS
Clyde N. Caton, Ashland, Oreg.
Application May 26, 1955, Serial No. 511,235
3 Claims. (Cl. 280—145)

This invention relates generally to vehicle body constructions and is more particularly concerned with bunker or trip stakes incorporated on vehicle beds of trucks, truck-trailers, railroad flat cars, etc., for retaining longitudinally extending piles or loads of material such as logs, lumber, beams and the like thereon, wherein said materials are unloaded over a longitudinal edge of the vehicle body, said bunker or trip stakes being pivoted on a horizontal pivot shaft adjacent, an outer longitudinal edge portion of said vehicle bed to permit positioning of said stakes in an overlying, erect or downwardly extending position, said position depending upon conditions of transport with the vehicle bed empty, loaded transporting conditions and unloading conditions, respectively.

Thus the principal object of invention in conformance with that set forth above is to provide with bunker or trip stakes of the character set forth a lower cam edge cooperating with a cam lock or shackle element controlled by a control rod extending transversely of the vehicle and a control lever pivotally mounted adjacent the longitudinal edge of the vehicle bed opposite that to which the bunker stakes are mounted, wherein the load on said bunker or trip stakes urges said stakes into a locking position when said stakes are in an erect position for retaining a load on said vehicle bed.

A still further object of invention in conformance with that set forth above is to provide means cooperating with said control lever for positively locking said locking lever in a position wherein the bunker stakes will be retained in a substantially erect position, said locking means insuring positive retention of a load on said vehicle bed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a further enlarged sectional view taken substantially on line 4—4 of Figure 2;

Figure 6 is a sectional view similar to that of Figure 2 showing another embodiment of cam structure on a bunker or trip stake and another type of cam or shackle element cooperating therewith;

Figure 7 is a sectional view similar to that of Figure 6 showing an alternate position of the bunker or trip stake;

Figure 8 is an enlarged sectional view taken substantially on line 8—8 of Figure 6;

Figure 9 is an enlarged sectional view taken substantially on line 9—9 of Figure 6 showing the control lever and lock structure therefor; and Figure 10 is a still further enlarged fragmentary side elevational view taken substantially on line 10—10 of Figure 9.

Figure 1:
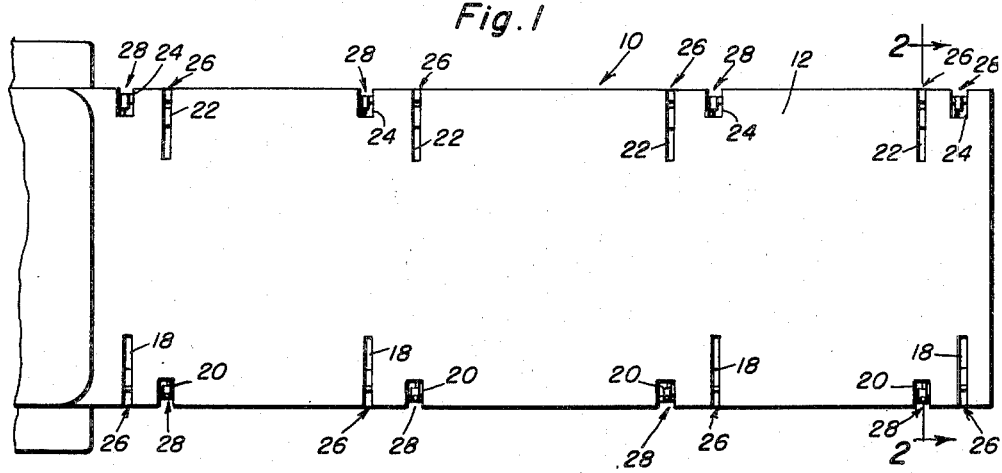
Figure 1 is a top plan view of a vehicle bed illustrating the relative position of a plurality of longitudinally spaced bunker or trip stakes on opposite longitudinal sides of a vehicle bed.
Figure 2:
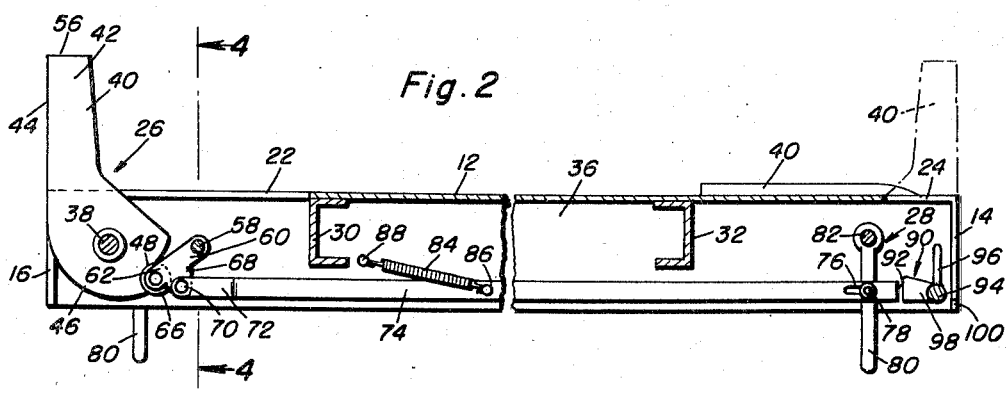
Figure 2 is an enlarged transverse sectional view taken substantially on line 2—2 of Figure 1 showing one embodiment of the cam on the lower portion of said bunker or trip stake including cooperating cam and shackle structure cooperating therewith.
Figure 3:
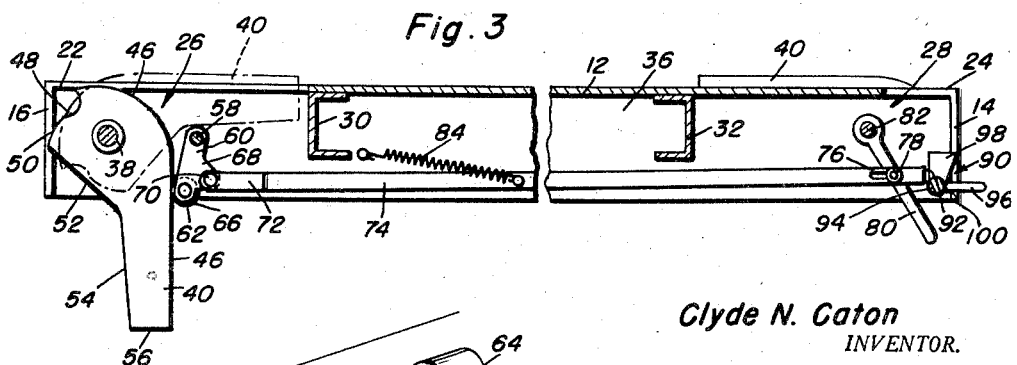
Figure 3 is a view similar to that of Figure 2 showing an alternate position of the bunker or trip stake structure.
Figure 5:
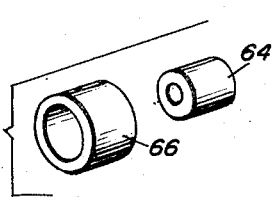
Figure 5 is an exploded perspective view of a cam roller element.

Indicated generally at 10 is a vehicle bed which includes a bed support portion 12 having downwardly extending longitudinal side flanges 14 and 16, the bed 12 and flanges 14 and 16 having extending therethrough notched out portions 18 and 20, and 22 and 24. The notched out portions 18 and 22 and 20 and 24 each include therein respectively a bunker or trip stake assembly 26 and control lever assembly 28 of the character disclosed in either Figures 2 and 3 or 6 and 7. Extending longitudinally of the bed 12 are a pair of spaced C-shaped channel members 30 and 32, as seen in Figures 2 and 3, or 30' and 32' as seen in Figures 6 and 7. These channels are secured to the underside of the bed 12 in any suitable manner, for example by means of welding, and have extending therebetween and secured to the underside of the bed 12 in any suitable manner, also for example by means of welding, downwardly extending plates 34 and 36, as seen in Figure 4, or 34' and 36' as seen in Figures 8 and 9.

The plates 34 and 36 or 34' and 36' each are disposed on opposite sides of the notch portions 18 and 24 or 20 and 22, to provide support means for horizontal pivot members which are incorporated in the bunker or trip stake assemblies 26 or lever control assemblies 28.

Referring more particularly to Figures 2, 3 and 4, a horizontal pivot shaft 38 is rotatably supported between the flange elements 34 and 36 and has secured thereon and rotatable therewith a bunker or trip stake element 40. The trip stake 40 includes an elongated upper portion having an outer side 44 continuing in a lower convex cam surface 46 terminating in a concave securing notch 48, see Figure 3, said concave notch continuing as the convex cam surface 50 which is intersected by a planar surface 52 extending into an inner side edge surface 54 which is intersected by the top edge 56 of the stake, said top edge intersecting the side 44 of said stake. It will be noted that the stake 40 may pivot about the shaft 38 to a position indicated by the dotted lines in Figure 3 wherein the stake extends in what might be defined as an overlying relationship relative to the vehicle bed 12, this position being that wherein no load is present upon said vehicle bed. The stake 40 may also be retained in a substantially erect position as seen in Figure 2, this being the position wherein a longitudinally extending load of logs, rails, etc., are piled on the bed 40, said logs, rails, etc., tending to roll over the longitudinal edges of the vehicle bed tending to pivot the stakes outwardly relative to said vehicle bed. As seen in Figure 3, the stake 40 is shown in solid lines in a position assumed wherein the stake is permitted to pivot outwardly and downwardly away from the longitudinal edge of the vehicle bed wherein the logs, rails, etc., are unloaded over the longitudinal edge of the vehicle bed.

Inwardly spaced on the shaft 38 and extending between the flanges 34 and 36 is a cam element support shaft 58 which has journalled thereon an elongated cam or shackle elements 60, see Figure 4, which carry therebetween at their lower ends 62 a cam roller shaft 64 which has journalled thereon a cam roller 66, said cam roller 66 being engageable on the cam surfaces 46 and 50 as well as in the concave notch 48 of the bunker stake 40. The cam or shackle elements include an attaching ear portion 68 which are secured by means of suitable pivot pins 70 to one of the bifurcated legs 72 of a control rod 74 which extends transversely of the vehicle bed 12 in parallel relation to the vertical flange 36, for example. The end of the control rod 74 opposite the bifurcated leg portion 72 includes an elongated slot 76 through which a transverse pin 78 is pivotally secured, said pin 78 extending from a hand controlled lever 80 which is pivotally supported on a pivot pin 82 which extends across the flanges 34 and 36, at the edge opposite that to which the bunker stake 40 is mounted. A tension spring element 84 is secured at one end 86 to an intermediate portion of the control rod 74, the other end of said spring being secured at 88 to the flange 36, for example. As seen in Figure 2, the spring 84 urges the control rod 74 and cam element 60 with the roller 66 into a leftward or outward direction wherein said roller 66 is in engagement with the concave portion 48 of the stake 40. In this position the stake 40 is retained in the substantially erect position of Figure 2, and movement of the lever, as seen in Figure 3, to an outboard or rightward direction as observed in Figure 3, results in permitting the stake 40 to be rotated in a clockwise position as indicated by the dotted lines of Figure 3 or alternatively when material is on the vehicle bed 12 may pivot outwardly in a counterclockwise direction wherein loading may take place over the longitudinal edge of the vehicle. In the position shown in Figure 3, the tension spring 84 will tend to urge the cam elements 60 and accordingly the cam roller 66 onto the cam surface 46 and thus when the stake 40 assumes the substantially erect position of Figure 2, the roller will be urged into engagement with the recess portion 48.

It will be noted that in order to rotate the cam elements 60 about the pivot pin 58 it is necessary for the control rod 74 to be moved toward the opposite flange of the vehicle bed to which the stake 40 is mounted. In order to prevent accidental reciprocation or movement of the cam elements 60 away from said stake, stop element 90 is provided adjacent the end 92 of the control rod, said stop element operating in a manner to be subsequently described. The stop element structure is the same for both the embodiment shown in Figures 2 and 3 as well as that of Figures 6 and 7.

The stop element 90 includes a transverse pivot shaft 94 extending between either the vertical flanges 34 and 36 or 34' and 36', see Figure 9, said shaft 94 having extending therefrom a handle element 96 and a weighted abutment element 98 which are disposed at approximately 90° with respect to each other, the abutment being operable to be rotated into the position to contact rod 74, and accordingly prevent the rotation of the bunker stake 40. It will be noted that notch 24 includes in the downwardly extending flanges of the bed 12 a transverse abutment portion 100 in Figures 2 and 3, or 100' in Figures 6 and 7, which is engageable by the stop handle 96 when the abutment portion 98 is rotated out of its engageable position with the end 92 of the control rod, see Figures 2 and 3 or 6 and 7.

As seen in Figures 9 and 10 in order to prevent excessive rotation of the abutment or stop portion 98 in the opposite direction, the vertical flange 36' includes thereon a transversely extending stop pin 102 which engages a stop pin 104 which extends radially from the pivot shaft 94 and the stop member 90.

The embodiment of invention disclosed in Figures 6 and 8 functions in the identical manner as that previously described, and like structure will be identified by like reference character.

The embodiment of Figures 6 through 8 includes bunker or trip stakes 40' which are pivotal with the pivot shaft 38, said stake including outer edge 44', said outer edge continuing as a convex lower curved portion 46' which terminates in a concave recess portion 48' which continues as a straight edge portion 50' continuing as an elongated straight edge portion 52' which is intersected by a top edge portion 54' which intersects the outer edge 44'.

Inwardly spaced from the shaft 38 is a cam element support shaft 58' which pivotally supports a circular cam or shackle element 60'. The cam element 60' is circular and is pivotally supported on a pivot shaft 58' off-center relative to the center of said circular element, including an outer rotatable ring portion 62' which rotatably engages the cam surface 46' and the recess portion 48' as clearly seen in Figures 6 and 7, the cam element 60' being pivotally connected to the bifurcated portion 72 of the control rod 74 by means of a pivot pin 68' which extends through the cam element 60' at a diametrical opposite position on said cam element.

The operation of this embodiment of the invention as previously mentioned is identical with respect to that previously described, wherein movement of the control lever 80 after the stop member 98 has been moved out of the way permits reciprocable movement of the control rod 74 whereupon the cam element 60' is pivoted out of the recess portion 48' of the bunker stake whereupon said stake may be moved to the position shown in Figure 7 whereupon unloading takes place over the longitudinal flange 16 or the stake may be pivoted into the dotted line position as shown in Figure 6. Tension spring 84 cooperates with the control rod 74 in the same manner as previously described.

Although not shown, suitable pressure lubrication fitting may be provided for expeditious lubrication of the various movable parts.

Thus it is believed readily apparent that there has been disclosed novel bunker stake structure which fully conforms with the objects of invention heretofore set forth.

Various positional directional terms such as "front," "rear," "side," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle bed, a bunk stake pivotally supported within a transverse slot portion adjacent one end of said vehicle bed for vertical swinging into and from upright position, said stake including a recess portion, a cam element pivotally supported in said slot and vertically swingable upwardly about its pivot to enter said recess portion and lock the stake upright, a reciprocable rod extending transversely of said vehicle bed and pivotally supported at one end on a portion of said cam element, said rod being endwise movable in one direction to swing said cam element upwardly, the other end of said rod being pivotally carried on an operating lever therefor pivotally carried on said vehicle bed, and stop means engageable with said rod after it has been moved endwise in said direction to prevent endwise movement of the rod in the opposite direction.

2. In the combination as set forth in claim 1 wherein said cam element comprises a pair of elongated spaced lever elements rotatably supporting a cam element therebetween, said lever elements being pivotally connected to a bifurcated end portion of said control rod.

3. In the combination as set forth in claim 1 wherein said cam element comprises a circular cam roller having an outer edge engageable with the recess portion of said stake, said cam element being pivotally connected on diametrically opposite pivots of the vehicle bed and a bifurcated end of said control rod, respectively.

References Cited in the file of this patent

UNITED STATES PATENTS 2,256,623    Newman    Sept. 23, 1941
2,700,552    Query    Jan. 25, 1955